United States Patent
Abdo

(10) Patent No.: US 7,024,422 B2
(45) Date of Patent: Apr. 4, 2006

(54) ESTIMATION OF CLUSTERING FOR ACCESS PLANNING

(75) Inventor: Abdo Esmail Abdo, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 595 days.

(21) Appl. No.: 10/209,515

(22) Filed: Jul. 31, 2002

(65) Prior Publication Data

US 2004/0024746 A1 Feb. 5, 2004

(51) Int. Cl.
*G06F 17/00* (2006.01)

(52) U.S. Cl. ............... 707/102; 707/101; 707/100; 707/104.1

(58) Field of Classification Search ............ 707/1, 707/2, 3, 100, 101, 104.1, 204; 711/170
See application file for complete search history.

(56) References Cited

U.S. PATENT DOCUMENTS

| | | | |
|---|---|---|---|
| 5,778,352 A * | 7/1998 | Inoue et al. ............ 707/1 |
| 5,930,828 A * | 7/1999 | Jensen et al. ............ 711/170 |
| 6,029,195 A * | 2/2000 | Herz ............ 725/116 |
| 6,370,549 B1 * | 4/2002 | Saxton ............ 707/205 |
| 6,470,330 B1 * | 10/2002 | Das et al. ............ 707/2 |
| 6,556,983 B1 * | 4/2003 | Altschuler et al. ............ 706/55 |
| 6,728,720 B1 * | 4/2004 | Lenzie ............ 707/101 |
| 6,792,399 B1 * | 9/2004 | Phillips et al. ............ 705/36 R |

OTHER PUBLICATIONS

Abdo Esmail Abdo, U.S. Appl. No. 09/818,044, (ROC920000274US1), filed Mar. 27, 2001, "Apparatus and Method for Determining Clustering Factor in a Database Using Block Level Sampling".

* cited by examiner

*Primary Examiner*—Charles Rones
*Assistant Examiner*—Sana Al-Hashemi
(74) *Attorney, Agent, or Firm*—Wood, Herro & Evans

(57) ABSTRACT

A method for computing clustering factor that is particularly suitable for use with existing indexes. The clustering factor is generated, by first determining clustered storage locations of records in a relation, i.e., locations where the records would be found if they were clustered relative to the attribute (e.g., locations for the records if they were ordered in storage in accordance with the attribute). Then, the actual storage locations of records are correlated to the clustered storage locations, and a clustering statistic is generated based upon the correlation.

15 Claims, 3 Drawing Sheets

FIG. 1A

| Row No. | Surname | Given Name | City | Make | Model | Year |
|---|---|---|---|---|---|---|
| ..... | ..... | ..... | ..... | ..... | ..... | ..... |
| 102 | Brown | Anne | Los Angeles | Toyota | Camry | 1991 |
| ..... | ..... | ..... | ..... | ..... | ..... | ..... |
| 886 | Johnson | Donald | Chicago | Pontiac | Grand Am | 1993 |
| ..... | ..... | ..... | ..... | ..... | ..... | ..... |
| 902 | Jones | Sue | Detroit | Chrysler | Concorde | 1998 |
| ..... | ..... | ..... | ..... | ..... | ..... | ..... |
| 952 | Miller | Robert | Kansas City | Chevrolet | Caprice | 2000 |
| ..... | ..... | ..... | ..... | ..... | ..... | ..... |
| 986 | Nelson | Laura | Dallas | Mercedes | 190E | 1995 |
| ..... | ..... | ..... | ..... | ..... | ..... | ..... |
| 1011 | Smith | Beth | Washington | Ford | Escort | 1998 |
| ..... | ..... | ..... | ..... | ..... | ..... | ..... |
| 1014 | Smith | Harold | Atlanta | VW | Passat | 1999 |
| ..... | ..... | ..... | ..... | ..... | ..... | ..... |
| 1563 | Unger | Thomas | Boston | Nissan | Sentra | 1989 |
| ..... | ..... | ..... | ..... | ..... | ..... | ..... |

FIG. 1B

| Row No. | Surname | Given Name | City | Make | Model | Year |
|---|---|---|---|---|---|---|
| ..... | ..... | ..... | ..... | ..... | ..... | ..... |
| 51 | Smith | Harold | Atlanta | VW | Passat | 1999 |
| ..... | ..... | ..... | ..... | ..... | ..... | ..... |
| 165 | Unger | Thomas | Boston | Nissan | Sentra | 1989 |
| ..... | ..... | ..... | ..... | ..... | ..... | ..... |
| 302 | Johnson | Donald | Chicago | Pontiac | Grand Am | 1993 |
| ..... | ..... | ..... | ..... | ..... | ..... | ..... |
| 655 | Jones | Sue | Detroit | Chrysler | Concorde | 1998 |
| 901 | Miller | Robert | Kansas City | Chevrolet | Caprice | 2000 |
| ..... | ..... | ..... | ..... | ..... | ..... | ..... |
| 721 | Nelson | Laura | Dallas | Mercedes | 190E | 1995 |
| ..... | ..... | ..... | ..... | ..... | ..... | ..... |
| 1268 | Brown | Anne | Los Angeles | Toyota | Camry | 1991 |
| ..... | ..... | ..... | ..... | ..... | ..... | ..... |
| 1496 | Smith | Beth | Washington | Ford | Escort | 1998 |
| ..... | ..... | ..... | ..... | ..... | ..... | ..... |

FIG. 2

| Row No. | Surname | Pointer |
|---|---|---|
| ..... | ..... | ..... |
| 102 | Brown | 1268 |
| ..... | ..... | ..... |
| 886 | Johnson | 302 |
| ..... | ..... | ..... |
| 902 | Jones | 655 |
| ..... | ..... | ..... |
| 952 | Miller | 901 |
| ..... | ..... | ..... |
| 986 | Nelson | 721 |
| ..... | ..... | ..... |
| 1011 | Smith | 1496 |
| ..... | ..... | ..... |
| 1014 | Smith | 51 |
| ..... | ..... | ..... |
| 1563 | Unger | 165 |
| ..... | ..... | ..... |

FIG. 5

| Surname | Pointer | P | PC |
|---|---|---|---|
| ..... | ..... | ..... | ..... |
| Brown | 1268 | 159 | 13 |
| ..... | ..... | ..... | ..... |
| Johnson | 302 | 38 | 111 |
| ..... | ..... | ..... | ..... |
| Jones | 655 | 82 | 113 |
| ..... | ..... | ..... | ..... |
| Miller | 901 | 113 | 119 |
| ..... | ..... | ..... | ..... |
| Nelson | 721 | 90 | 123 |
| ..... | ..... | ..... | ..... |
| Smith | 1496 | 187 | 126 |
| ..... | ..... | ..... | ..... |
| Smith | 51 | 6 | 127 |
| ..... | ..... | ..... | ..... |
| Unger | 165 | 21 | 195 |
| ..... | ..... | ..... | ..... |

ESTIMATION OF CLUSTERING FOR ACCESS PLANNING

FIELD OF THE INVENTION

This invention generally relates to a database management system performed by computers.

BACKGROUND OF THE INVENTION

Statistics are frequently accumulated to describe data in a database, to facilitate accesses made to the data. Statistics are typically used by an optimizer to create an access plan for accessing the data. For example, when a query seeks records meeting multiple selection criteria, the optimizer may determine that the results may assembled most efficiently by applying the selection criteria in an appropriate order. Ordering is important because the process of scanning a database for matching records is time consuming.

Among the factors considered in formulating an access plan, are the number of swaps between memory and disk that are required to satisfy a query for data. To estimate this typically requires a prediction of memory buffer usage. For example, consider a database table (otherwise known as a relation) including columns (otherwise known as attributes) identifying vehicle owners by name and city, and the make, model, model year and other information about their vehicles. A database of this kind is shown in FIG. 1A of the drawings, which shows just eight selected rows of a much larger relation of over one thousand rows, as can be seen from the row number which is included to the left of each row. It should also be noted that the rows of the relation are ordered by the owner's surname. An exemplary query into such a relation may seek rows (otherwise known as tuples) identifying the following attribute values: surname "Smith", city name "Atlanta", and vehicle manufacturer "VW"; that is, seeking Atlanta named Smith who own VW vehicles. This query involves forming the intersection or "AND" of the results of three selection criteria, "Smith", "Atlanta", and "VW".

If the data is arranged on disk storage in order according to the surname of the vehicle owners, as it is in FIG. 1A, the tuples meeting criteria on the surname attribute, are likely to be found by reading only a relatively small number of records from a relatively small number of pages of disk storage. For example, the row number for Beth Smith is 1011 and the row number for Harold Smith is 1014, so these are likely to be in a common page that can be swapped from disk to memory. In this case, the described query would be most efficiently performed by selecting rows based upon that ordered criterion first, i.e., selecting those rows having the surname "Smith", and then identifying those rows within that initial result in the city "Atlanta", and then identifying those rows within that intermediate result with the value "VW" for the vehicle manufacturer attribute. A far less efficient approach would be to identify all persons with "VW" vehicles, and then locating those with the surname "Smith" or addresses in the city "Atlanta".

However, in many cases, the data will be somewhat or completely randomly organized on disk with regard to an attribute of interest. FIG. 1B is a table with the same data as in FIG. 1A, but not ordered by the owner's surname. Rather, in the illustrated example, the eight rows illustrated in FIG. 1A are randomly scattered on disk. In such a situation, retrieving tuples meeting the first criterion, i.e., owner surname "Smith", is likely to require an extensive number of reads from dispersed areas in disk storage. (The two Smiths noted above, appear in rows 51 and 1496.) Indeed, the data may be closer to correctly ordered on another attribute, such as the city attribute, than it is in the owner surname attribute. Thus, with the data ordered as shown in FIG. 1B, it would be best to perform the criterion on another attribute first, and then perform the criterion on the owner's surname and vehicle manufacturer.

To attempt to optimize query processing, modern database software often estimates the clustering of data prior to attempting to execute a query. U.S. Pat. No. 5,043,872 described a method for calculating a clustering coefficient from an index for a relation.

As discussed in the '872 patent, most relational data base systems maintain indexes for their relations. An index is a list stored separately from the relation, and used to select tuples in the relation for access. An index typically is much smaller than the relation, because it usually indexes only one or a few attributes of the relation, so that tuples of interest in the relation can be identified and retrieved without scanning the relation itself. In a typical single-attribute index, such as is shown in FIG. 2, each entry in the index corresponds to one tuple in the relation, and contains the value of the attribute for that tuple, and a pointer to the location of the tuple in disk storage. The index of FIG. 2 is an index for the owner attribute of the table organized according to FIG. 1B. The owner surnames in the index are in a sorted order, and thus appear at the same locations (row numbers) as the corresponding rows in the sorted table of FIG. 1A; however, the pointers in the index identify the actual locations of those rows in the actual table ordering shown in FIG. 1B.

The clustering factor described in the '872 patent is computed from an index such as that of FIG. 2. The clustering factor is proportional to the number of rows which, when in index order, are in a sequence which is the same as the sequence in which they are stored on the data pages. This clustering coefficient is used to estimate the number of pages to be accessed during the index scan. The number of page accesses may then be used to select an access path for a query, join, or other indexed data base operation.

U.S. Pat. No. 5,778,353 describes a refinement of the '872 patent, that accounts for variations in the size of the buffer pool available, at the time access strategy is being developed (i.e. when the optimizer is selecting the best index). Both of these U.S. Patents are hereby incorporated herein by reference.

While the '872 patent describes an effective scheme for improving access planning by computing a clustering factor, the method of computation is complex and consumes substantial processing resources as part of performing an optimization of an access plan. A less computationally expensive computation of clustering factor would therefore have an important performance advantage.

SUMMARY OF THE INVENTION

In accordance with principles of the present invention, this need is met through the use of a method for computing clustering that is particularly suitable for use with existing indexes. A clustering statistic is generated, by first determining clustered storage locations of records in a relation, i.e., locations where the records would be found if they were clustered relative to the attribute (e.g., locations for the records if they were ordered in storage in accordance with the attribute). Then, the actual storage locations of records are correlated to the clustered storage locations, and a clustering statistic is generated based upon the correlation.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1A is a diagram of an exemplary relation (table) in which the tuples (rows) are ordered by owner's surname, and FIG. 1B is a diagram of the same relation, in which the tuples (rows) are not so ordered;

FIG. 2 is a diagram of an index of the relation of FIG. 1B on the owner's surname attribute;

FIG. 5 shows the clustering factors for the diagram in FIG. 2.

DETAILED DESCRIPTION OF SPECIFIC EMBODIMENTS

Figure 3:
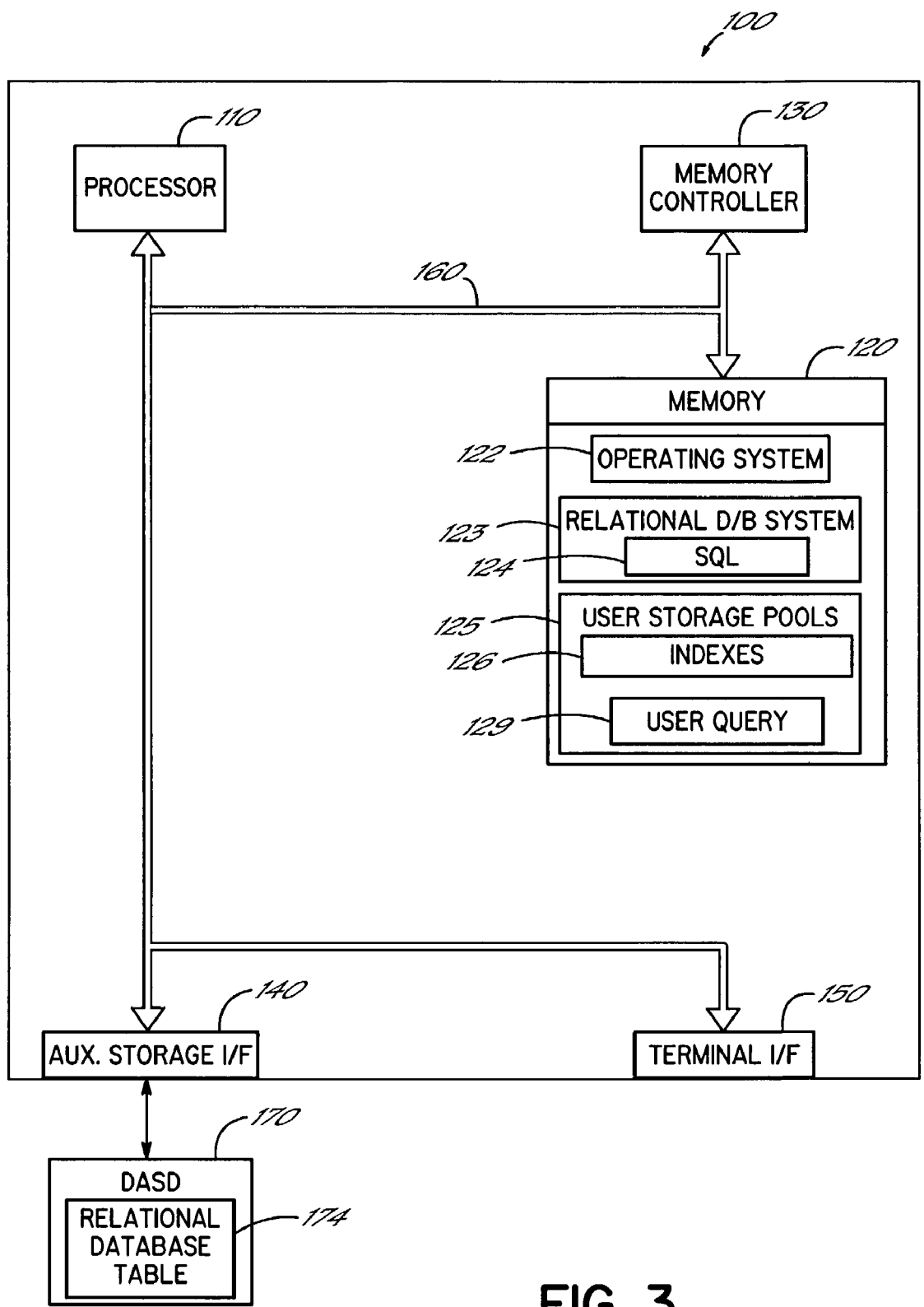
FIG. 3 is a block diagram of a computer system managing a database according to an embodiment of the present invention.

The methods of the present invention employ computer-implemented routines to query information from a database. Referring now to FIG. 3, a block diagram of a computer system which can implement an embodiment of the present invention is shown. The computer system shown in FIG. 3 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 3 within the scope of the present invention such as the addition of cache memory or other peripheral devices. FIG. 3 is presented to simply illustrate some of the salient features of an exemplary computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table or relation 174 from auxiliary storage devices, such as magnetic disk (e.g., hard disks or floppy diskettes) or optical storage devices (e.g., CD-ROM). As shown in FIG. 3, one suitable storage device is a direct access storage device (DASD) 170. DASD 170 may alternatively be a floppy disk drive which may read programs and data such as relational database table 174 from a floppy disk. In this application, the term "disk" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 3 contains only a single main processor 110 and a single system bus 160, it should be understood that the present invention applies equally to computer systems having multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include indexes 126 such as that illustrated in FIG. 3, as well as storage for temporary data such as a user query 129. User query 129 is a request for information from relational database table 174 stored in DASD 170. The methods of the present invention do not require that the entire relational database table be loaded into memory 120 to obtain the information requested in user query 129. Instead, indexes are loaded into memory 120 and provide relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 3, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide requests for information in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular index 127 exists that can facilitate scanning for requested data more efficiently than another database index or than the relational database housed in DASD 170. In order for an index to be useful to the methods of the present invention, the index must be built over the database fields specified by the criteria in user query 129. That is, there must be an index for those particular fields in that particular database.

Figure 4:
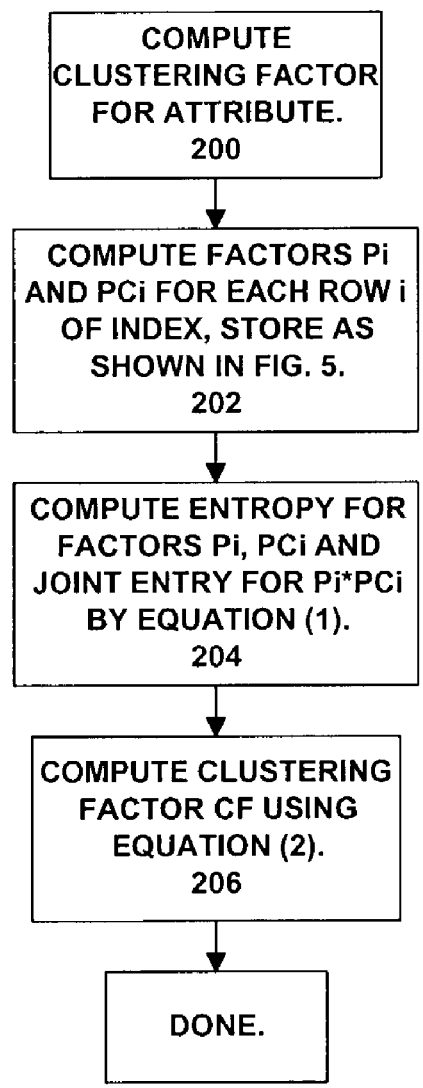
FIG. 4 is a flow chart of a process of computing a clustering factor for the table of FIG. 1B using the index of FIG. 2.

Referring to FIG. 4, the process 200 for generating a clustering factor for an attribute of a table for which there is an index, can be explained. In a first step 202 of the process, the factors $P_1$ and $PC_1$ are computed for each entry listed in the table's index for the attribute, and stored. $P_i$ is a positive integer identifying the virtual memory page (on disk) where the data for each row i is located, and $PC_i$ is a positive integer identifying the virtual memory page (on disk) where that entry i would be located were the rows stored on disk ordered according to the attribute. The computed factors may be stored with the index used to generate them, or separately. There will be two factors $P_i$ and $PC_i$ for each row i, as shown in FIG. 4.

The factor $P_i$ may be readily calculated for each row i of the index, based upon the pointer in that row, as that pointer identifies the actual virtual memory location of the data for the corresponding row. In the simplified example of FIG. 2, it is assumed that there are eight rows on each virtual memory page, and that the first row of the table is on the first virtual memory page, so the virtual memory location of a row can be is generated by simply dividing the row number by eight. In a more realistic example, the first row of the table would not be on the first virtual memory page, so the lowest page number $P_1$ would be greater than one. It should also be noted that there are various virtual memory schemes, each with its own conversion from a virtual memory address pointer to a page number, ranging from truncation of more significant bits of the virtual address, to table lookup schemes, and others. In any case, the factor $P_i$ can be computed from the pointer to a row, and stored.

The factor $PC_i$ may also be easily calculated for each row i of the index. The rows in the index are already ordered in accordance with the values of the attribute that is indexed, as shown in FIG. 2. Accordingly, the row number of an entry in the index, can be directly converted to the virtual memory location the corresponding row in the relation would have, if the rows were ordered based upon the index, and that virtual memory location can then be converted to a page number. This calculation simply involves determining the page number containing the first row of the table, and the number of rows in each page, and then dividing the row number by the number of rows per page, and adding the result to the number of the first page. In the simplified example of FIG. 3, the first rows of the table are assumed to be stored in the first virtual memory page, so the row numbers in the index can be converted to page numbers simply by division by eight, i.e., dividing by the number of rows on a page.

The factors $P_1$ and $PC_1$ computed as described above, are shown in FIG. 5 adjacent to the corresponding table rows. In the next step 204 of the process 200 of FIG. 4, the entropies for the factors $P_i$, $PC_1$ and the joint entropy for $P_{i*}PC_1$ are computed. Each entropy calculation $H[x_1 \ldots x_N]$ is computed by $$H[x_1 \ldots x_N] = \sum_{i=1}^{N} x_i \log\left(\frac{1}{x_i}\right) \quad (1)$$

Finally, in step 206, the clustering factor CF is computed from the computed entropies using Equation 2.

$$CF = H[P_1 \ldots P_N] + H[PC_1 \ldots PC_N] - H[(P_1 * PC_1) \ldots (P_N * PC_N)] \quad (2)$$

The clustering factors computed as described, can then be used by an optimizer to select ordering for satisfying queries, as described above. The significant advantage of the clustering factor calculation described herein, as compared to those described in the prior patents, is that the calculation is very simplified and requires no more data than is already available in attribute indexes that already exist in storage. The resulting clustering factors, however, are equally useful in characterizing the dispersal of data on disk, as those described in the prior patents referenced above.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the examples provided herein have been explained in the context of a database program implementing standard query language (SQL), the invention may be used in the context of a database program using any other declarative database language. The invention relates to implementation of a database program and is not limited to any particular end user language. The invention in its broader aspects is therefore not limited to the specific details, representative apparatus and method, and illustrative example shown and described. Accordingly, departures may be made from such details without departing from the spirit or scope of applicant's general inventive concept.

The invention claim is:

1. A method for generating a clustering statistic for an attribute of a relation to be used in optimizing execution of a query directed to one or more attributes of said relation, comprising:

accessing records of said relation from a database in electronic storage;

determining clustered storage locations of records in said relation, said clustered storage locations being locations where said records would be found in the event that said records were clustered relative to said attribute;

computing a correlation between actual storage locations of records in said relation and said clustered storage locations of said records; and generating said clustering statistic based upon said correlation;

utilizing said statistic in execution of a query and retrieval of said records from said electronic storage.

2. The method of claim 1 wherein said locations where said records would be found in the event that said records were clustered relative to said attribute, are locations where said records would be found in the event that said records were ordered in storage in accordance with said attribute.

3. The method of claim 1 wherein computing a correlation comprises computing an entropy of said actual storage locations and said clustered storage locations.

4. The method of claim 3 wherein computing a correlation comprises computing a joint entropy of said actual and clustered storage locations.

5. The method of claim 4 wherein computing a correlation comprises subtracting said joint entropy of said actual and clustered storage locations from a sum of said entropy of said actual storage locations and said entropy of said clustered storage locations.

6. The method of claim 1 wherein said clustered storage locations are computed using an index formed over an attribute for which the clustering statistic is being computed.

7. A computer system implementing a relational database system and generating a clustering statistic for an attribute of a relation of said relational database, to be used in optimizing execution of a query directed to one or more attributes of said relation, comprising:

electronic storage for said relational database, including a relation having a plurality of tuples including values for a plurality of attributes; and computing circuitry performing query optimization and query execution upon said relational database, said query optimization including generating a clustering statistic for an attribute of said relation by determining clustered storage locations of records in said relation, said clustered storage locations being locations where said records would be found in the event that said records were clustered relative to said attribute, computing a correlation between actual storage locations of records in said relation and said clustered storage locations of said records, generating said clustering statistic based upon said correlation, and utilizing said statistic in execution of a query and retrieval of said records from said electronic storage.

8. The computer system of claim 7 wherein said locations where said records would be found in the event that said records were clustered relative to said attribute, are locations where said records would be found in the event that said records were ordered in storage in accordance with said attribute.

9. The computer system of claim 7 wherein computing a correlation comprises computing an entropy of said actual storage locations and said clustered storage locations.

10. The computer system of claim 9 wherein computing a correlation comprises computing a joint entropy of said actual and clustered storage locations.

11. The computer system of claim 10 wherein computing a correlation comprises subtracting said joint entropy of said actual and clustered storage locations from a sum of said entropy of said actual storage locations and said entropy of said clustered storage locations.

12. The computer system of claim 7 wherein said clustered storage locations are computed using an index formed over an attribute for which the clustering statistic is being computed.

13. A program product for implementing a relational database system and generating a clustering statistic for an attribute of a relation of said relational database, to be used in optimizing execution of a query directed to one or more attributes of said relation, comprising:

a relational database, including a relation that is electronically stored and accessed and has a plurality of tuples including values for a plurality of attributes; and relational database software performing query optimization and query execution upon said relational database, said query optimization including generating a clustering statistic for an attribute of said relation by determining clustered storage locations of records in said relation, said clustered storage locations being locations where said records would be found in the event that said records were clustered relative to said attribute, computing a correlation between actual storage locations of records in said relation and said clustered storage locations of said records, and generating said clustering statistic based upon said correlation, and utilizing said statistic in execution of a query and retrieval of said records from electronic storage; and a signal bearing media holding said relational database and relational database software.

14. The program product of claim 13 wherein the signal bearing media comprises transmission media.

15. The program product of claim 13 wherein the signal bearing media comprises recordable media.

* * * * *